March 15, 1960     C. R. LOPP ET AL     2,928,253
THERMOELECTRIC APPARATUS FOR COOLING AND HEATING LIQUIDS
Filed April 7, 1958     2 Sheets-Sheet 1

INVENTORS:
CHARLES R. LOPP
WARREN R. DANIELSON
BY Schroeder, Hofgren, Brady & Wegner
ATT'YS

INVENTORS:
CHARLES R. LOPP
WARREN R. DANIELSON

United States Patent Office 2,928,253
Patented Mar. 15, 1960

2,928,253

THERMOELECTRIC APPARATUS FOR COOLING AND HEATING LIQUIDS

Charles R. Lopp and Warren R. Danielson, Benton Harbor, Mich., assignors to Whirlpool Corporation, a Delaware corporation Application April 7, 1958, Serial No. 726,973

11 Claims. (Cl. 62—3)

This invention relates to an apparatus for cooling and heating separate bodies of fluid.

The apparatus of this invention provides means for heating and cooling separate bodies of fluid and particularly liquids by thermoelectric heating by means of banks of Peltier couples. The hot junctions of the couples are used to heat one body of fluid while the cold junctions of the couples are used to cool another body of fluid. In addition, the temperature in the heated fluid portion of the apparatus is preferably maintained substantially constant when no heated fluid is being withdrawn from the system by providing auxiliary cooling means therefor.

One of the features of this invention is to provide improved apparatus for cooling and heating separate bodies of fluid comprising a thermoelectric structure having spaced hot junctions and cold junctions, means thermally contacting one body of fluid with the hot junctions for heating said fluid, means thermally contacting the other body of fluid with the cold junctions for cooling said fluid, and a separate chamber connected to said heated body of fluid to receive heated fluid therefrom preparatory to dispensing the same.

Another feature is to provide such an improved apparatus comprising a thermoelectric structure having spaced hot junctions and cold junctions, means thermally contacting one body of fluid with the hot junctions for heating said fluid, means thermally contacting the other body of fluid with the cold junctions for cooling said fluid, a closed fluid circuit for said heated body of fluid, means for causing fluid flow through the circuit, means for cooling the fluid in a portion of said circuit, and a separate chamber connected to said heated body of fluid to receive heated fluid therefrom.

Other features and advantages of the invention will be apparent from the following description of certain embodiments thereof shown in the accompanying drawings. Of the drawings.

In each of the embodiments shown in the accompanying drawings banks or panels of Peltier couples are used both for heating and for cooling. These banks are illustrated in diagrammatic drawings as the structure and use of these banks are well known in the art. Representative Peltier couple banks are shown and described in the copending application of M. K. Baer, Jr., and C. R. Lopp, Serial No. 735,804, filed May 16, 1958.

Figure 1:
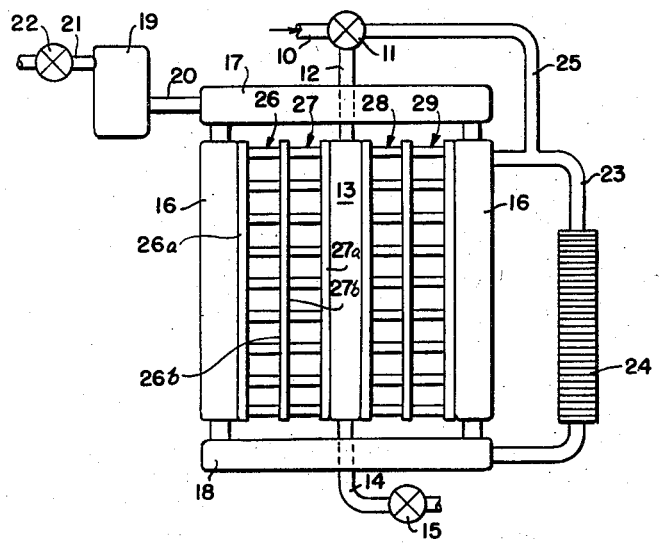
Figure 1 is a semi-diagrammatic elevational view of an apparatus embodying the invention.

In the embodiment of Figure 1 there is provided an inlet water pipe 10 leading to a valve 11. A pipe 12 leads from this valve to a cooling chamber 13 with the other side of the chamber connected to an outlet pipe 14 having a valve 15 therein.

Spaced from the cooling chamber 13 and on opposite sides thereof are a pair of heating chambers 16. The two heating chambers are connected at their tops and bottoms by an upper chamber 17 and a lower chamber 18. Thus the two chambers 16 and the chambers 17 and 18 form a closed circuit for the water in these chambers. Connected to the upper chamber 17 is a hot water supply chamber 19 provided with an inlet 20 adjacent to its bottom and an exit 21 adjacent to its top leading through valve 22.

Extending between the top of the heating chamber 16 opposite to the supply chamber 19 and the bottom chamber 18 is a pipe 23 which includes in the circuit an air cooled finned heat exchanger 24. The top portion of the pipe 23 is connected by means of a pipe 25 to the valve 11.

Positioned in thermal contact with the cooling chamber 13 and the two heating chambers 16 are banks of Peltier couples 26, 27, 28 and 29. In the embodiment shown the bank 26 has its hot junctions 26a in thermal contact with the lefthand heating chamber 16 and its cold junctions 26b in thermal contact with the hot junctions 27b of the couple bank 27. The cold junctions 27a of the bank 27 are in thermal contact with the cooling chamber 13. With this arrangement the two banks 26 and 27 are arranged to provide a cascading effect. The other pair of couple banks 28 and 29 are arranged in a similar cascading manner with the cold junctions on one side of the pair of banks in thermal contact with the chamber 13 and the hot junctions on the other side of the pair in thermal contact with the other heating chamber 16.

With this arrangement the water or other fluid is maintained cool in the thermoelectrically cooled chamber 13 until cool water is required. At that time the valve 11 is opened so as to provide flow from the pipe 10 into the pipe 12 and the valve 15 is opened to permit exit of the cooled water. When the requirement for cooled water has been met the two valves close. Thus the cooling chamber 13 is always maintained substantially full of water.

When there is a requirement for heated water the valve 11 is opened to permit water to flow from pipe 10 through pipe 25 and into the circuit that includes heated water chambers 16, upper and lower chambers 17 and 18, pipe 23 and pipe 24. At the same time valve 22 is opened. This permits the incoming water through pipe 10 to force heated water out through supply chamber 19. The supply chamber 19 provides heated water for ready access and may itself be heated by supplemental heating means if desired. Thus again the entire system is maintained substantially full of water at all times.

During those periods when no hot water is being withdrawn from the system the water in the heated water circuit is maintained at a substantially constant temperature by automatic thermosyphon air cooled means. Thus the air cooled radiator 24 serves to cool the heated water in the circuit that includes pipe 23. This cooling causes the cool water to flow downwardly into the bottom chamber 18 and to force hot water from the chambers 16 into the pipe 23. The water from the lefthand chamber 16 flows into the pipe 23 by means of the upper chamber 17. Thus under conditions of no withdrawal of hot water there will be a substantially continuous circulation through the radiator 24 to provide a cooling effect.

Figure 2:
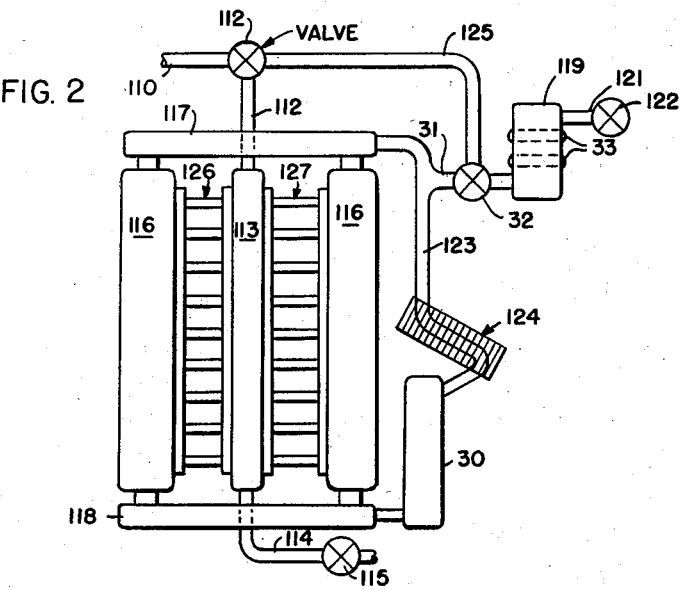
Figure 2 is a view similar to Figure 1 but showing a second embodiment.

In the embodiment shown in Figure 2 a pair of thermocouple banks 126 and 127 is provided between the cooling chamber 113 and a pair of heating chambers 116. Upper and lower chambers 117 and 118 are provided to connect the top and bottom of the chambers 116. A side pipe 123 is provided through a radiator 124 of the air cooled type into a small lower chamber 30 and from there into the bottom chamber 118. Thus the heated water circuit here includes the chambers 116, 117, 30 and 118 and the pipe 123 and radiator 124. An inlet valve 112 and an outlet valve 115 are also provided. Extending from the pipe 123 is an outlet pipe 31 which connects through a valve 32 to the bottom of a hot water supply chamber 119. This chamber is provided with electrical heating units 33 for supplemental heating. The upper end of this chamber is provided with an outlet pipe 121 controlled by a valve 122. The inlet valve 112 from an inlet pipe 110 is connected by a cold water inlet pipe 112 to the top of the cooling chamber 113 and the bottom of the cooling chamber is connected by a pipe 114 to the outlet valve 115.

In the embodiment of Figure 2 the supply of cold water is controlled as described above in connection with Figure 1. The supply of hot water is controlled by means of valve 32. When valve 112 is opened into pipe 125 which leads to valve 32 and valves 32 and 122 are opened the incoming water forces hot water from the chamber 119 through the valve 122. Because the opening of the valve 32 opens conduit 31 on both sides of valve 32 the entire system is maintained filled with water at all times. During the time when no water is being withdrawn from the hot water portion of the system the radiator 124 provides automatic cooling means in the hot water circuit in the manner previously described.

Figure 3:
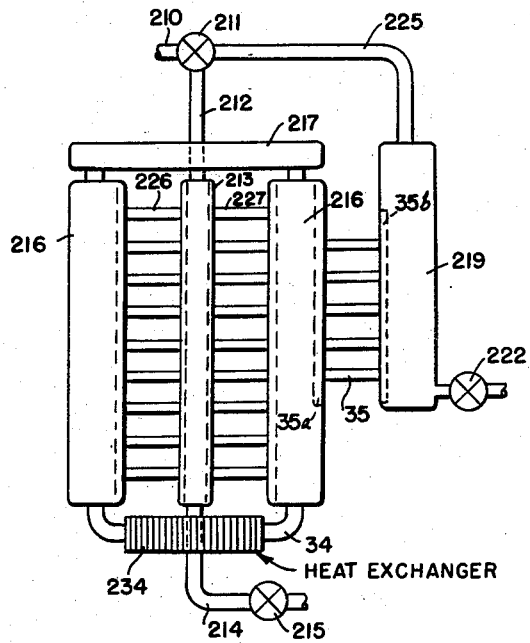
Figure 3 is a view similar to Figure 1 but showing a third embodiment.

In the embodiment shown in Figure 3 there is provided a cold water chamber 213, a pair of spaced heated liquid chambers 216 and a pair of thermocouple banks or panels 226 and 227. There is also provided a separate hot water supply chamber 219, an inlet valve 211, a water supply pipe 225 to the top of chamber 219, a pipe 212 from valve 211, an upper liquid chamber 217, an inlet water pipe 210, an outlet water pipe 214 from the bottom of the cooling chamber 213 and a valve 215 in this outlet pipe.

In this embodiment the couple banks 226 and 227, as in the previous embodiments, cool the water in the chamber 213. The hot junctions of the two panels are in actual contact with the liquid in the heating chambers 216. These heating chambers contain a heat transfer medium such as a hydrocarbon oil. The bottoms of these two chambers 216 are connected by means of a pipe 34 which passes through an air cooled heat exchanger 234. With this arrangement the heat transfer liquid within the system including the chambers 216 and 217 and pipe 34 is kept substantially constant by means of flow through the heat exchanger 234 set up by the thermosyphon in the manner previously described.

In order to heat the water in the chamber 219 an auxiliary thermocouple panel 35 is provided. The cold junctions 35a of this panel are in actual contact with the liquid in one chamber 216 while the hot junctions 35b are in thermal contact with water within the chamber 219 but electrically insulated therefrom.

With the structure as described in Figure 3 the heat transfer liquid is in a closed circuit and ordinarily no additional liquid needs to be supplied. In withdrawing cold water from the system the valve 211 is opened to connect pipes 210 and 212 to cause supply water to flow into the chamber 213. At substantially the same time the outlet valve 215 is opened so as to permit cold water to flow from the chamber. In supplying hot water from the apparatus the valve 211 is turned to permit supply water to flow from the inlet pipe 210 into the supply pipe 225 and from there into the top of the heated water chamber 219. At substantially the same time the outlet valve 222 is opened to permit the hot water to flow from the chamber 219.

Figure 4:
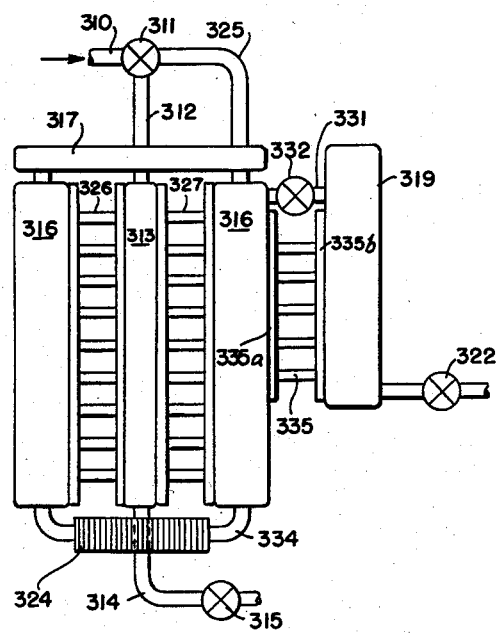
Figure 4 is a view similar to Figure 1 but showing a fourth embodiment.

In the embodiment shown in Figure 4 pipes 310, 325, 312 and 314 are provided as well as valves 311, 315, 322 and 332. Valve 332 is in pipe 331 which extends between one of the two hot water chambers 316 and the top of a hot water supply chamber 319. An upper chamber 317 is provided extending between the tops of the two heated water chambers 316 and a lower pipe 334 is provided extending between the bottoms of these chambers and passing through an air cooled heat exchanger 324. In addition two thermoelectric panels 326 and 327 are provided together with an auxiliary panel 335. The two principal panels 326 and 327 function as previously described to cool water in the cooling chamber 313 and heat water in the chambers 316. The auxiliary panel 335 has its hot junctions 335b in thermal contact with the chamber 319 and its cold junctions 335a in thermal contact with one of the heated water chambers 316.

With this arrangement cold water can be forced from the cold water tank by means of valves 311 and 315 in the manner described in the previous embodiments. Hot water can be forced from the system by opening valves 332 and 322 and turning valve 311 to the position where water flows from the supply pipe 310 into the pipe 325. Thus in this embodiment, as in the other embodiments, the cold water portion of the system is maintained substantially full of water at all times and the hot water portion of the system is also maintained substantially full at all times. Similarly under conditions when no hot water is being withdrawn from the apparatus the hot water will be maintained at a substantially constant temperature by means of thermosyphon flow through the air cooled heat exchanger 324. This thermosyphon flow in this embodiment, as in the previous embodiment in Figure 3, is also aided by having the cold junctions 335a in contact with one of the heated water chambers 316.

Having described our invention as related to the embodiments shown in the accompanying drawings, it is our intention that the invention be not limited by any of the details of description, unless otherwise specified, but rather be construed broadly within its spirit and scope as set out in the accompanying claims.

We claim:

1. Apparatus for cooling and heating separate bodies of fluid, comprising: a thermoelectric structure having spaced hot junctions and cold junctions; means thermally contacting one body of fluid with the hot junctions for heating said fluid; means thermally contacting the other body of fluid with the cold junctions for cooling said fluid; means maintaining the temperature of the one body of fluid substantially constant; and a separate chamber connected to said heated body of fluid to receive heated fluid therefrom preparatory to dispensing the same.

2. The apparatus of claim 1 wherein said separate chamber is provided with heating means.

3. Apparatus for cooling and heating separate bodies of fluid, comprising: a thermoelectric structure having spaced hot junctions and cold junctions; means thermally contacting one body of fluid with the hot junctions for heating said fluid; means thermally contacting the other body of fluid with the cold junctions for cooling said fluid; a closed fluid circuit for said heated body of fluid; means for causing fluid flow through the circuit; means for cooling the fluid in a portion of said circuit to maintain the temperature of that body of fluid substantially constant; and a separate chamber connected to said heated body of fluid to receive heated fluid therefrom.

4. Apparatus for cooling and heating separate bodies of fluid, comprising: a thermoelectric structure having spaced hot junctions and cold junctions; a chamber for cooled fluid in thermal contact with said cold junctions; a pair of chambers for heated fluid spaced from each other and in thermal contact with said hot junctions; means interconnecting said pair of heated fluid chambers in a closed circuit for fluid flow therethrough; and means for cooling a part of said closed circuit.

5. Apparatus for cooling and heating separate bodies of liquid, comprising: a chamber for cooled liquid; a chamber for heated liquid; a thermoelectric structure having cold junctions in contact with said cooled liquid chamber and hot junctions in contact with said heated liquid chamber; a closed fluid circuit including said heated chamber; means for causing fluid flow through the circuit; means spaced from said hot junctions for cooling the liquid in said circuit to maintain the temperature thereof substantially constant; and a separate chamber connected to said heated chamber to receive liquid therefrom preparatory to dispensing the same.

6. The apparatus of claim 5 wherein a pair of said heated chambers are provided interconnected in series to form at least a portion of said circuit.

7. The apparatus of claim 5 wherein a liquid conduit is provided connected to said circuit for simultaneously forcing fresh liquid into said circuit and heated liquid from said circuit into said separate chamber.

8. The apparatus of claim 5 wherein an auxiliary thermoelectric structure is provided having cold junctions thermally contacting said circuit and hot junctions thermally contacting said separate chamber.

9. Apparatus for cooling and heating separate bodies of liquid, comprising: a chamber for cooled first liquid; a chamber for heated second liquid; a thermoelectric structure having cold junctions in contact with said cooled liquid chamber and hot junctions in contact with said heated liquid chamber; a closed fluid circuit including said heated chamber; means for causing fluid flow through the circuit; a separate chamber for said second liquid; and an auxiliary thermoelectric structure having cold junctions thermally contacting said circuit and hot junctions thermally contacting said separate chamber.

10. Apparatus for cooling and heating separate bodies of liquid, comprising: a chamber for cooled liquid; a chamber for heated liquid; a thermoelectric structure having cold junctions in contact with said cooled liquid chamber and hot junctions in contact with said heated liquid chamber; a closed fluid circuit including said heated chamber; means for causing fluid flow through the circuit including cooling means for a portion thereof spaced from said hot junctions; a separate chamber; a liquid conduit communicating with said cooled liquid chamber and said separate chamber for forcing fresh liquid into said chambers; and means for supplying heat to said separate chamber.

11. The apparatus of claim 10 wherein said heat supplying means includes a thermoelectric structure having cold junctions in thermal contact with said circuit and hot junctions in thermal contact with said separate chamber.

References Cited in the file of this patent

UNITED STATES PATENTS

| | | |
|---|---|---|
| 420,641 | Dewey | Feb. 4, 1890 |
| 2,837,899 | Lindenblad | June 10, 1958 |
| 2,870,610 | Lindenblad | Jan. 27, 1959 |